United States Patent [19]
Douce

[11] 4,165,758
[45] Aug. 28, 1979

[54] EARTHQUAKE RESPONSIVE VALVE

[76] Inventor: Donald R. Douce, 1517 Merced, Sp. 62, South El Monte, Calif. 91733

[21] Appl. No.: 842,040

[22] Filed: Oct. 14, 1977

[51] Int. Cl.² .............................................. F16K 17/36
[52] U.S. Cl. ..................................................... 137/38
[58] Field of Search ............................... 137/38, 39, 45

[56] References Cited
U.S. PATENT DOCUMENTS

| | | | |
|---|---|---|---|
| 1,742,685 | 1/1930 | Brandon | 137/38 |
| 3,890,993 | 6/1975 | MacNeilage | 137/45 |
| 4,007,643 | 2/1977 | Matsushita | 137/38 X |

Primary Examiner—Robert G. Nilson
Attorney, Agent, or Firm—William P. Green

[57] ABSTRACT

An earthquake responsive valve having a lever structure which is mounted to swing about an axis and has two arms projecting in different directions and carrying two weights respectively balanced against one another in a relation such that one of the weights normally overbalances the other and retains the valve in open position but is displaceable by earthquake forces to an inactive position releasing the lever structure for valve closing movement.

20 Claims, 5 Drawing Figures

EARTHQUAKE RESPONSIVE VALVE

BACKGROUND OF THE INVENTION

This invention relates to improved devices for automatically closing a valve in response to earthquake forces, or other similar vibrational or shock forces.

In the event of an earthquake, great damage can occur as a result of leakage of gas, water, or other fluids upon rupture of a fluid line. For example, escaping gas can cause highly destructive fires or explosions, and escaping water or other liquids can build up in a home or other building in a manner causing damage to furniture, carpets, drapes, and other contents of the building. Various types of valves have been proposed for automatically closing off a stream of fluid in response to the vibrational or other forces of an earthquake, including for example the devices shown in U.S. Pat. Nos. 3,890,933, 2,054,563, 2,158,753, 2,255,965, 3,768,497, and 3,927,689.

SUMMARY OF THE INVENTION

A valve assembly constructed in accordance with the present invention is adapted to respond in a very positive and direct manner to earthquake forces or other similar unusual vibratory or shock forces, in a manner substantially instantaneously and completely closing the valve element against all flow of fluid therethrough unless and until the device is subsequently reset for further operation. The assembly may employ as the valving element proper a completely conventional valve unit, with addition thereto of an extremely simple automatic response unit for actuating the device in the event of an earthquake. The actuator can be very ruggedly built, and need include no intricate mechanism which might become inoperative by corrosion or other effects resulting from long periods of inactivity between earthquake induced actuations.

Structurally, an assembly embodying the invention includes two weights, and a mechanism which is operable by those weights to actuate the valve, with the mechanism being designed to balance the weights against each other, and with one of the weights normally overbalancing the other to releasably retain the valve in open position. In the event of an earthquake, this weight which normally holds the valve open is displaced from a holder on which it is usually supported, and by such displacement releases the mechanism for valve closing movement. Desirably, the mechanism includes a lever structure having two arms extending in different directions for carrying the two weights respectively, with the lever being pivotally movable about a predetermined axis to actuate the valve when the displaceable valve is moved from its holder. Preferably, a spring pressed element is carried by the holder and yielding urged upwardly against the displaceable weight, to assist in assuring lateral movement of the weight off of the holder if an earthquake which is encountered is primarily of the vertical type which might otherwise merely move the weight upward from its holder and then allow it to settle back downwardly thereonto.

BRIEF DESCRIPTION OF THE DRAWING

The above and other features and objects of the invention will be better understood from the following detailed description of the typical embodiments illustrated in the accompanying drawing in which.

DESCRIPTION OF THE PREFERRED EMBODIMENTS

Figure 1:
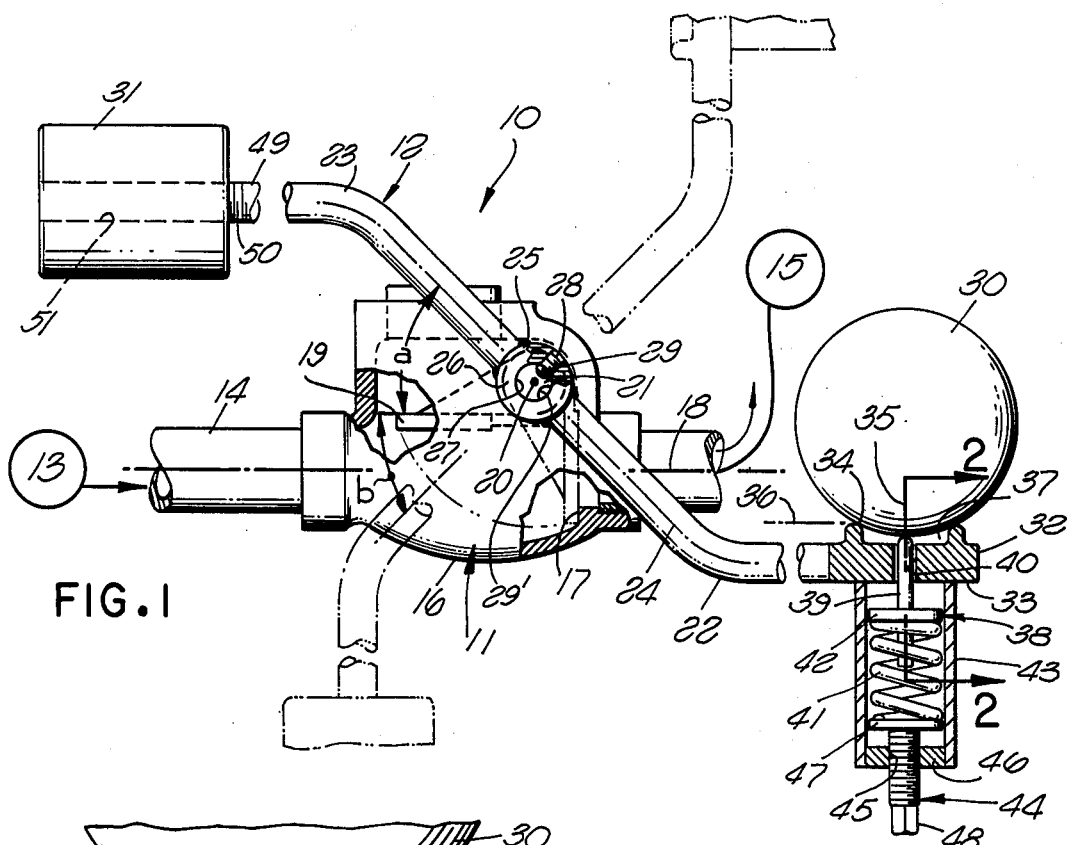
FIG. 1 is a side view of an earthquake shut-off valve assembly constructed in accordance with the invention.

With reference first to FIG. 1, there is represented at 10 an earthquake responsive valve assembly, including a flapper type valve 11 which is controlled by an automatic actuator 12. The valve 11 controls flow of a fluid, such as gas, water, a hydrocarbon liquid, or the like, from a source 13 in a left to right direction as viewed in FIG. 1, and through a line 14 to a location 15. The valve includes a conventional valve body 16 containing a circular seat 17 centered about a horizontal axis 18 and facing leftwardly in FIG. 1. An essentially circular valve element 19 is mounted to swing about a horizontal axis 20 between the full line open position of FIG. 1 and the broken line closed position of engagement with seat 17. Element 19 is carried by a cylindrical shaft 21 projecting to the exterior of the valve body 16 in sealed relation and along axis 20 for connection to the actuator 12.

The earthquake responsive actuating unit 12 has two arms 22 and 23 which project in different directions with respect to axis 20, and which preferably project in directly diametrically opposite directions along an axis 24 perpendicular to and intersecting axis 20. The arms 22 and 23 may be rigidly connected at their inner ends, as by welding at 25, to a common tubular hub element 26 disposed about shaft 21. Internally, hub 26 may have a cylindrical inner surface 27 of a diameter just slightly greater than the external diameter of shaft 21, to be a close fit thereon, with a set screw 28 being carried by hub 26 and being tightenable inwardly against the shaft and into either of two circulary offset shallow recesses 29 and 29' to rigidly lock the hub and carried arms on the shaft in either of two relatively circularly offset positions. Desirably, these two positions are offset 90° from one another.

In the FIG. 1 full line open position of the valve, the arms 22 and 23 and their common axis 24 may be disposed at approximately a 45° angle a with respect to the horizontal. In the broken line closed position of the mechanism, arms 22 and 23 may be turned 90° from their full line position, and be disposed at a second 45° angle b with respect to the horizontal.

Arms 22 and 23 carry two actuating weights 30 and 31, which are balanced against one another, but with the mass and/or lever arm of weight 30 being such as to normally overbalance weight 31 as seen in FIG. 1, and hold the valve in open position. Weight 30 is supported on a holder 32 which is rigidly carried by arm 22 at its extremity, and which is shaped to form an essentially horizontal base 33 (horizontal in the FIG. 1 full line position), from which a circular rim 34 projects upwardly about a vertical axis 35, with the upper extremity of this circular rim lying in a horizontal plane 36.

The weight 30 is preferably externally spherical, to be supported on rim 34 and project downwardly a short distance into recess 37 formed within the rim. Thus, in the FIG. 1 full line position, the weight 30 is supported in very stable relation by holder 32. In the event of an earthquake, however, the inertia of weight 30 tends to cause it to remain in a fixed position while shock forces displace holder 32, with resultant lateral displacement of weight 30 off of the holder to fall downwardly and allow the holder to swing upwardly to its broken line position by the opposite weight 31.

To assist in displacing the weight laterally relative to the holder if the earthquake or other shock forces are of a directly vertical or generally vertical nature, holder 32 movably carries at its underside a member 38, having a pin portion 39 projecting upwardly through a central opening 40 in base 33 of the holder, with member 39 being yieldingly urged upwardly relative to the holder by a coil spring 41 acting against a flange 42 of member 39, and with the member 39 and coil spring being retained by a tubular housing part 43 rigidly secured at its upper end to holder 32 as by welding. The force of coil spring 41 may be adjusted by an adjusting screw 44 threadedly connected at 45 into a bottom wall 46 of tubular housing 43 and having an upper flange portion 47 acting against the bottom of the spring. The lower end of screw 44 may have a square or other non-circular portion 48 to be engaged and turned by a suitable tool. When weight 30 is received in the holder under normal non-earthquake conditions, the force of spring 41 is insufficient to overcome the mass of weight 30, and the member 39 is thus held downwardly by the weight. However, if there is an earthquake which causes weight 30 to move upwardly relative to the holder 32, as to the position represented in FIG. 2, spring 41 causes member 39 to follow weight 30 upwardly and exert a force which, upon even the slightest movement of weight 30 laterally relative to member 39, will tend to force weight 30 further laterally and thus encourage movement of the weight laterally off of the holder to fall downwardly and release the holder for upward movement.

The second weight 31 may be secured to arm 23 in any appropriate manner, as by providing arm 23 with a horizontally turned extremity 49, having threads 50 which are threadedly connectable into a bore 51 in weight 31.

Figure 2:
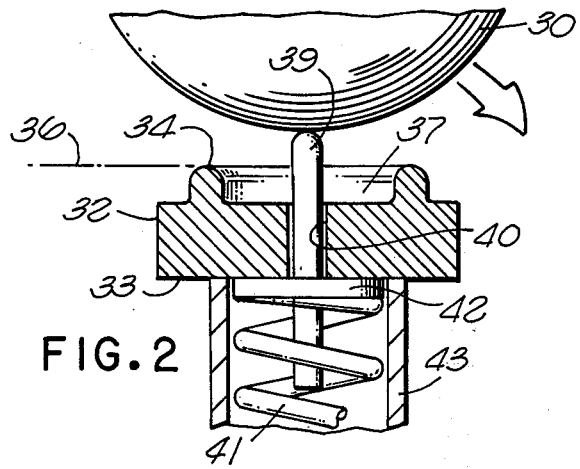
FIG. 2 is an enlarged fragmentary vertical section taken on line 2—2 of FIG. 1, and showing the displaceable weight in an upwardly actuated position.

In describing the use of the apparatus of FIGS. 1 and 2, assume first of all that the actuator 12 is to be employed in conjunction with a valve 11 mounted for horizontal fluid flow through the valve in the manner illustrated in FIG. 1. Under such circumstances, hub 26 is connected to shaft 21 as shown in FIG. 1, with the set screw 28 received within the higher recess 29 in the shaft. Weight 30 is then placed on holder 32, to depress member 39 against the force of spring 41 as shown, and in that condition the mass of weight 30 multiplied by its lever arm with respect to axis 20 is greater than the product of the mass of weight 31 and its lever arm, to hold arm 22 downwardly and hold arm 23 in its upper position and thereby retain the valve open. If an earthquake occurs, the relative displacement of holder 32 and weight 30 causes the weight to move laterally relative to rim 34 of the holder far enough to enable the weight to fall downwardly off of the holder and release the holder for upward movement to its broken line position in a manner closing valve element 19. As previously mentioned, if the displacement of the ball 30 relative to holder 32 is approximately directly vertical, because of correspondingly vertical earthquake movement, the upward force exerted by spring 41 through member 39 against the ball will tend to amplify the effect of any very slight lateral movement of the weight 30 relative to member 39 and the holder, so that the spring force will in effect push the weight laterally and assist in its displacement off of the holder. Adjustment of screw 44 varies the force exerted by spring 41, and thus adjusts the discussed effect of member 39 to attain a desired proper sensitivity of the device. It is further noted that even if the primary movement of the earth is horizontal rather than vertical, the force exerted by member 39 will have the same lateral displacing effect on weight 30, and consequently adjustment of screw 44 will adjust sensitivity to lateral movements as well as vertical movements.

Figure 3:
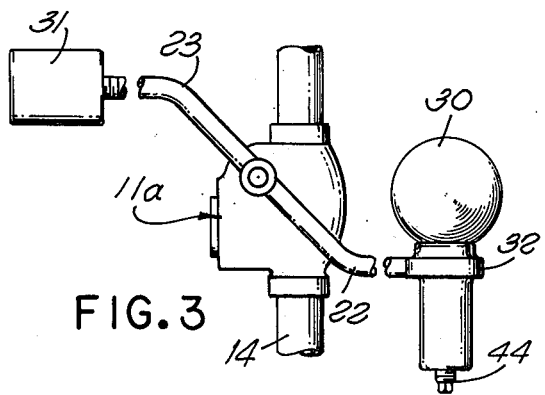
FIG. 3 is a side view of the device of FIGS. 1 and 2 attached to a valve in a vertical flow position.

If a valve such as that shown in FIG. 1 is to be utilized in a vertical flow position, as represented at 11a in FIG. 3, the hub 26 of actuator 12 is turned relative to shaft 21 to a position in which set screw 28 is received within the second recess or notch 29' in the shaft (offset 90 degrees from notch 29), so that the weights will be received in the same positions illustrated in FIG. 1 when the valve extends vertically. Tightening of the set screw will retain the lever type actuator in the discussed second setting, following which weight 30 will hold the valve open until an earthquake is encountered, at which time weight 30 is displaced from its holder 32 and the mechanism swings in a counterclockwise direction to a position wuch as that shown in broken lines in FIG. 1 to close the valve.

Figure 4:
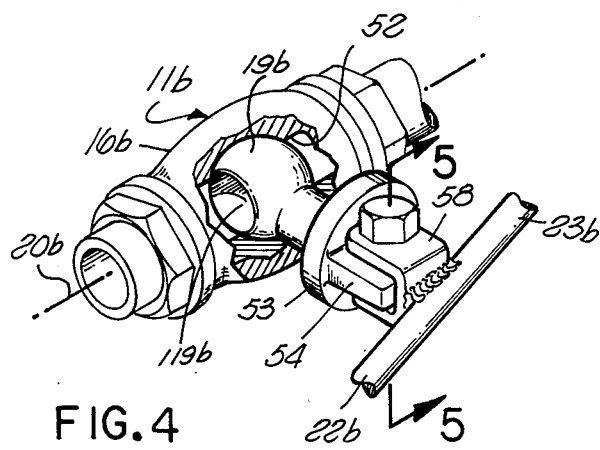
FIG. 4 is a perspective representation of a variational form of mounting for the lever structure.
Figure 5:
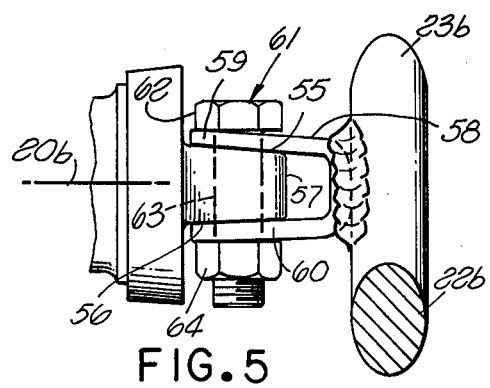
FIG. 5 is an enlarged fragmentary vertical section taken on line 5—5 of FIG. 4.

FIGS. 4 and 5 show a variational arrangement which is the same as that shown in FIGS. 1 to 3 except that a different type of valve 11b has been substituted for the valve 11 or 11a, and is connected to the arms 22b and 23b of the actuator (corresponding to arms 22 and 23 of FIG. 1) in a different manner. More particularly, valve 11b includes a valve body 16b containing a conventional rotary valve element 19b through which a passage 119b extends, with the valve 19b being mounted to turn about an axis 20b relative to body 11b and between the illustrated FIG. 4 open position in which passage 119b is aligned with the main fluid flow passage 52 in body 11b, and a closed position turned 90° about axis 20b from the illustrated setting. At the outside of the body, element 19b is connected to a member 53 having a portion 54 extending essentially diametrically with respect to axis 20b. This portion 54 has parallel flat opposite side faces 55 and 56 at opposite sides of axis 20b, and a flat end face 57 extending transversely of axis 20b. The arms 22b and 23b (corresponding to arms 22 and 23 in FIG. 1) may in FIGS. 4 and 5 be formed as portions of a single elongated metal rod or tube, which is welded or otherwise rigidly secured at its center to a U-shaped connector part 58, bent to have two parallel plate portions 59 and 60 received at opposite sides of portion 54 of part 53. A screw 61 has a head 62 at one side of the U-shaped member 58, and has a shank 63 extending through registering apertures in the two plates 60 and 61 and portion 54 to lock them together in fixed relative positions, with a nut 64 connected onto the screw to clamp U-shaped part 58 against portion 54. The arms 22b and 23b carry a holder and weight such as those shown at 32 and 31 in FIG. 1, with the holder releasably supporting a spherical weight such as that shown at 30. The angularity of arms 22b and 23b with respect to connector 58 is such that the weights have the same relationship illustrated in FIG. 1 when valve 19b of FIGS. 4 and 5 is open. When an earthquake displaces weight 30 from its holder, the arm 22b swings upwardly to a position such as that shown in broken lines in FIG. 1, and the arm 23b swings downwardly, and when the arms are thus displaced 90° about their axis, the valve 19b is closed to shut off further fluid flow.

In addition to the two types of valves typically illustrated, the invention can of course be applied to operation of any of numerous other types of valves.

While certain specific embodiments of the present invention have been disclosed as typical, the invention is of course not limited to these particular forms, but rather is applicable broadly to all such variations as fall within the scope of the appended claims.

I claim:

1. An earthquake responsive assembly comprising:
   a valve;
   two weights; and
   mechanism for actuating said valve between open and closed positions and which balances said weights against eacht other with a first of the weights normally overbalancing the second and releasably retaining the valve in open position;
   said mechanism including a holder for said first weight through which force is exerted on said mechanism by said first weight, and from which said first weight is displaceable by earthquake shock or the like in a relation releasing said mechanism for valve closing actuation by the second weight;
   said valve including a valve element mounted to swing about a predetermined axis between open and closed positions;
   said mechanism including a lever structure connected to said valve element for pivotal movement about said axis and having two arms projecting in different directions and carrying said weights respectively.

2. An earthquake responsive assembly comprising:
   a valve;
   two weights; and
   mechanism for actuating said valve between open and closed positions and which balances said weights against each other with a first of the weights normally overbalancing the second and releasably retaining the valve in open position;
   said mechanism including a holder for said first weight through which force is exerted on said mechanism by said first weight, and from which said first weight is displaceable by earthquake shock or the like in a relation releasing said mechanism for valve closing actuation by the second weight;
   said valve having an actuating element mounted to turn about a predetermined axis to close the valve;
   said mechanism including a member adapted to pivot about said axis and operable to actuate said element pivotally between open and closed valve positions;
   there being means for connecting said member to said element in a plurality of different relatively rotatively adjusted positions so that said weights can actuate the valve when the latter is mounted in differently oriented positions.

3. An earthquake responsive assembly comprising:
   a valve;
   two weights; and
   a mechanism for actuating said valve between open and closed positions and which balances said weights against each other with a first of the weights normally overbalancing the second and releasably retaining the valve in open position;
   said mechanism including a holder for said first weight through which force is exerted on said mechanism by said first weight, and from which said first weight is displaceable by earthquake shock or the like in a relation releasing said mechanism for valve closing actuation by the second weight;
   said mechanism including an element mounted to said holder and spring urged upwardly relative to the holder and against said first weight when supported by the holder and tending upon upward movement of said first weight relative to the holder to move upwardly and encourage lateral displacement of the first weight relative to the holder.

4. An earthquake responsive assembly comprising:
   a valve;
   two weights; and
   mechanism for actuating said valve between open and closed positions and which balances said weights against each other with a first of the weights normally overbalancing the second and releasably retaining the valve in open position;
   said mechanism including a holder for said first weight through which force is exerted on said mechanism by said first weight, and from which said first weight is displaceable by earthquake shock or the like in a relation releasing said mechanism for valve closing actuation by the second weight;
   said holder having a circular portion forming an upwardly facing recess within which said weight is partially received on the holder;
   said mechanism including an element carried by said holder and movable vertically relative thereto and projecting upwardly into said recess at a location to engage said first weight, and a spring yieldingly urging said element upwardly.

5. An earthquake responsive unit as recited in claim 4, including means for adjusting the force of said spring.

6. An earthquake responsive assembly comprising:
   a valve;
   two weights; and
   mechanism for actuating said valve between open and closed positions and which balances said weights against each other with a first of the weights normally overbalancing the second and releasably retaining the valve in open position;
   said mechanism including a holder for said first weight through which force is exerted on said mechanism by said first weight, and from which said first weight is displaceable by earthquake shock or the like in a relation releasing said mechanism for valve closing actuation by the second weight;
   said valve having a valve element pivotable about a generally horizontal axis between open and closed positions;
   said mechanism including a lever structure connected to said element to swing about said axis and having arms projecting in generally opposite directions and carrying said first weight holder and said second weight respectively;

said holder having an essentially circular upwardly projecting rim for supporting said weight and forming a recess within said rim partially receiving said first weight.

7. An earthquake responsive unit as recited in claim 6, in which said first weight is essentially spherical.

8. An earthquake responsive unit as recited in claim 7, including means for connecting said lever structure to said element in either of two relatively circularly offset positions for actuating said valve in two different orientations.

9. An earthquake responsive unit as recited in claim 8, in which said mechanism includes an element mounted to said holder for relative vertical movement and projecting upwardly into said recess and against said first weight, and a spring yieldingly urging said last mentioned element upwardly relative to the holder.

10. An earthquake responsive assembly comprising:
a valve;
two weights, and
mechanism for actuating said valve between open and closed positions and which balances said weights against each other with a first of the weights normally overbalancing the second and releasably retaining the valve in open position;
said mechanism including a holder for said first weight through which force is exerted on said mechanism by said first weight, and from which said first weight is displaceable by earthquake shock or the like in relation releasing said mechanism for valve closing actuation by the second weight;
said valve having an externally cylindrical shaft mounted to turn about an axis for actuating the valve between open and closed positions;
said mechanism including a lever structure having a hub portion received about said shaft and carrying a set screw selectively tightenable into either of two circularly offset recesses in said shaft to connect the lever structure to the shaft in either of two circularly offset positions.

11. An earthquake responsive assembly comprising:
a valve;
two weights; and
mechanism for actuating said valve between open and closed positions and which balances said weights against each other with a first of the weights normally overbalancing the second and releasably retaining the valve in open position;
said mechanism including a holder for said first weight through which force is exerted on said mechanism by said first weight, and from which said first weight is displaceable by earthquake shock or the like in a relation releasing said mechanism for valve closing actuation by the second weight;
said valve having an actuating element mounted to turn about a predetermined axis and having a flat sided portion extending diametrically of said axis;
said mechanism including a U-shaped part received about said flat sided portion and connectable thereto.

12. An earthquake responsive unit for actuating a valve between open and closed positions, comprising:
two weights; and
mechanism connectable to said valve for actuating it between open and closed positions, and which balances said weights against each other with a first of the weights normally overbalancing the second and retaining the valve in open position;
said mechanism including a holder for said first weight through which force is exerted on said mechanism by said first weight and from which said first weight is displaceable by earthquake shock or the like in a relation releasing said mechanism for actuation by said second weight in valve closing direction;
said mechanism including an element carried by said holder and movable vertically relative thereto and projecting upwardly into engagement with said first weight, and a spring yieldingly urging said element upwardly relative to the holder.

13. An earthquake responsive unit as recited in claim 12, including means for adjusting the force of said spring.

14. An earthquake responsive unit for actuating a valve between open and closed positions, comprising:
two weights; and
mechanism connectable to said valve for actuating it between open and closed positions, and which balances said weights against each other with a first of the weights normally overbalancing the second and retaining the valve in open position;
said mechanism including a holder for said first weight through which force is exerted on said mechanism by said first weight and from which said first weight is displaceable by earthquake shock or the like in a relation releasing said mechansim for actuation by said second weight in valve closing direction;
said mechanism including a lever structure having arms projecting in two different directions for carrying said two weights respectively and having a hub portion connectable to said valve, and means for attaching said hub portion to said valve in either of two relatively circularly offset positions for actuating the valve by the weights in different orientations of the valve.

15. An earthquake responsive unit for actuating a valve between open and closed positions, comprising:
two weights; and
mechanism connectable to said valve for actuating it between open and closed positions, and which balances said weights against each other with a first of the weights normally overbalancing the second and retaining the valve in open position;
said mechanism including a holder for said first weight through which force is exerted on said mechanism by said first weight and from which said first weight is displaceable by earthquake shock or the like in a relation releasing said mechanism for actuation by said second weight in valve closing direction;
said mechanism including a lever structure having two arms carrying said two weights respectively and projecting in two different directions, and having a circular hub portion with a set screw tightenable against an actuating shaft of the valve.

16. An earthquake responsive assembly comprising:
a valve;
two weights; and
mechanism for actuating said valve between open and closed positions and which balances said weights against each other with a first of the weights normally overbalancing the second and releasably retaining the valve in open position;

said mechanism including a holder for said first weight through which force is exerted on said mechanism by said first weight, and from which said first weight is displaceable by earthquake shock or the like in a relation releasing said mechanism for valve closing actuation by the second weight;

said mechanism including a lever structure having two arms for carrying said two weights respectively and projecting in different directions and having a U-shaped connector portion to be received about and connected to an actuating portion of said valve, and a screw extending through said U-shaped portion to attach it to the valve.

17. An earthquake responsive assembly comprising:
a valve;
two weights; and
mechanism for actuating said valve between open and closed positions and which balances said weights against each other with a first of the weights normally overbalancing the second and releasably retaining the valve in open position;

said mechanism indlucing a lever mounted to turn about a predetermined axis and having arms projecting in different directions for carrying said two weights respectively; a holder for said first weight through which force is exerted on said lever structure by said first weight, and from which said first weight is displaceable by earthquake shock or the like in a relation releasing said mechanism for valve closing actuation by the second weight; and means mounting said holder to one of said arms of said lever structure for arcuate swinging movement of the holder therewith about said axis.

18. An earthquake responsive unit as recited in claim 17, in which said valve includes a valve element mounted for pivotal movement about a predetermined axis by said mechanism and between open and closed positions.

19. An earthquake responsive unit as recited in claim 17, in which said arcuately movable holder has a circular portion forming an upwardly facing recess within which said weight is partially received on the holder.

20. An earthquake responsive unit for actuating a valve between open and closed positions, comprising:
two weights; and
mechanism connectable to said valve for actuating it between open and closed positions, and which balances said weights against each other with a first of the weights normally overbalancing the second and retaining the valve in open position;

said mechanism including a lever structure mounted to turn about a predetermined axis and having arms projecting in different directions for carryinhg said two weights respectively; a holder for said first weight through which force is exerted on said mechanism by said first weight and from which said first weight is displaceable by earthquake shock or the like in a relation releasing said mechanism for actuation by said second weight in valve closing direction; and means mounting said holder to one of said arms of said lever structure for arcuate swinging movement of the holder therewith about said axis.

* * * * *